(12) United States Patent
Ishigo et al.

(10) Patent No.: US 8,408,799 B2
(45) Date of Patent: Apr. 2, 2013

(54) BEARING FOR CONNECTING ROD OF INTERNAL COMBUSTION ENGINE

(75) Inventors: Osamu Ishigo, Inuyama (JP); Atsushi Okado, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 285 days.

(21) Appl. No.: 12/855,345

(22) Filed: Aug. 12, 2010

(65) Prior Publication Data

US 2011/0058762 A1 Mar. 10, 2011

(30) Foreign Application Priority Data

Sep. 10, 2009 (JP) ................................ 2009-209161

(51) Int. Cl.
- *F16C 33/10* (2006.01)
- *F16C 9/02* (2006.01)
- *F16C 25/00* (2006.01)

(52) U.S. Cl. .................. 384/288; 384/273; 384/294

(58) Field of Classification Search .......... 384/273–275, 384/286, 288, 291, 295, 296, 429, 431, 432
See application file for complete search history.

(56) References Cited

U.S. PATENT DOCUMENTS

| | | | | |
|---|---|---|---|---|
| 2,131,170 A | * | 9/1938 | Evans | 384/291 |
| 2,822,222 A | * | 2/1958 | Love | 384/288 |
| 6,176,621 B1 | * | 1/2001 | Naitoh et al. | 384/291 |
| 2003/0179966 A1 | * | 9/2003 | Hojo et al. | 384/288 |
| 2004/0136627 A1 | * | 7/2004 | Klier | 384/429 |
| 2005/0196084 A1 | * | 9/2005 | Kitahara et al. | 384/288 |
| 2005/0263125 A1 | * | 12/2005 | Terada et al. | 123/196 R |
| 2009/0169141 A1 | * | 7/2009 | Ishigo et al. | 384/288 |
| 2010/0046869 A1 | * | 2/2010 | Matsuyama | 384/288 |

FOREIGN PATENT DOCUMENTS

| | | | |
|---|---|---|---|
| JP | 03048017 A | * | 3/1991 |
| JP | 07139539 A | | 5/1995 |
| JP | 09210064 A | | 8/1997 |
| JP | 10325410 A | | 12/1998 |
| JP | 2005069283 A | | 3/2005 |
| JP | 2008095858 A | | 4/2008 |
| JP | 2008215563 A | | 9/2008 |
| JP | 2009174697 A | | 6/2009 |

* cited by examiner

*Primary Examiner* — Thomas R Hannon
*Assistant Examiner* — Alan Waits
(74) *Attorney, Agent, or Firm* — Browdy and Neimark, PLLC

(57) ABSTRACT

A connecting rod bearing is constituted of a pair of semi-cylindrical bearings I and II. In a state in which the semi-cylindrical bearings are assembled into a cylindrical shape, along two contact surfaces C of circumferential end surfaces, first axial oil grooves E are formed to be located at a central portion in a bearing width direction, and second axial oil grooves F are formed to be located at both sides in the bearing width direction of each of the first axial oil grooves E. One of the first axial oil grooves E and two of the second axial oil grooves F are in relation to communicate with each other. The first axial oil groove E is formed in the range of the wall thickness decreasing region surface A.

8 Claims, 10 Drawing Sheets

BEARING FOR CONNECTING ROD OF INTERNAL COMBUSTION ENGINE

BACKGROUND OF THE INVENTION

The present invention relates to a connecting rod bearing for an internal combustion engine which is configured so that a lubricant oil which is supplied to an inner circumferential surface of a main bearing supporting a crankshaft is supplied to an inner circumferential surface of a connecting rod bearing (sliding bearing) which rotatably supports a crankpin which connects a connecting rod and the crankshaft through an inner lubricant oil passage of the crankshaft, and the connecting rod bearing is constituted of a pair of semi-cylindrical bearings.

The crankshaft of an internal combustion engine is supported at a cylinder block lower portion of the internal combustion engine via a main bearing constituted of a pair of semi-cylindrical bearings in its journal part. For the main bearing, a lubricant oil which is discharged by an oil pump is fed into a lubricant oil groove which is formed along an inner peripheral surface of the main bearing through a through-port formed in a wall of the main bearing from a oil gallery formed in a cylinder block wall. Further, a first lubricant oil passage is formed to penetrate through the journal portion in a diameter direction of the journal portion, and openings at both ends of the first lubricant oil passage communicate with the lubricant oil groove. Furthermore, a second lubricant oil passage which branches from the first lubricant oil passage in the diameter direction of the journal portion and passes through a crank arm portion is formed, and the second lubricant oil passage communicates with a third lubricant oil passage which is formed to penetrate through a crankpin in a diameter direction of the crankpin. Thus, the lubricant oil which is fed into the oil groove formed in the inner circumferential surface of the main bearing through the through-port formed in the wall of the main bearing from the oil gallery in the cylinder block wall passes through the first lubricant oil passage, the second lubricant oil passage and the third lubricant oil passage to be supplied to between sliding surfaces of the crankpin and a connecting rod bearing from an outlet port at an end portion (more specifically, a lubricant oil outlet port which is present in an outer circumferential surface of the crankpin) of the third lubricant oil passage.

The lubricant oil which is fed to the connecting rod bearing portion through the journal portion of the crankshaft from the cylinder block of the internal combustion engine is likely to be accompanied by foreign matters which are present in the lubricant oil passage of each portion. It is feared that if the foreign matters accompany the lubricant oil and are fed to between the sliding surfaces of the crankpin and the connecting rod bearing, they cause damage to the sliding surface of the connecting rod bearing.

As the countermeasure against the foreign matters entering a lubricant oil, there is proposed a sliding bearing which is constituted of a pair of semi-cylindrical bearings, and adopts the configuration in which a crush relief is formed on the inner circumferential surface of the bearing adjacent to the contact portion of the semi-cylindrical bearings, a soft layer formed from a material with a low hardness such as Pb or Sn is formed on the crush relief surface, and the foreign matters included in the lubricant oil are embedded in the soft layer and caught (JP-A-2008-215563). The crush relief indicates the region with the decreased wall thickness where the bearing wall thickness of the region near the end surface in the circumferential direction of the semi-cylindrical bearing is gradually decreased toward the end surface in the circumferential direction. The position of the center of curvature of the bearing inner circumferential surface in the wall thickness decreasing region differs from the position of the center of curvature of the bearing inner circumferential surface in the other region (specified by section 3.2, DIN1497). The crush relief is formed with the intention of absorbing a positional deviation and deformation of the butt end surfaces of semi-cylindrical bearings when a pair of semi-cylindrical bearings are assembled to a connecting rod.

Thus, in the internal combustion engines of recent years, reduction in weight has been intended with the objective of enhancing fuel economy, and the connecting rods tend to be low in rigidity. Since a connecting rod reciprocally moves and elastically deforms when the internal combustion engine operates, the sliding bearing at the large end portion of the connecting rod also follows the deformation of the connecting rod, and the clearance (gap between the sliding bearing inner circumferential surface and the crankpin surface) in the horizontal direction of the sliding bearing repeats increase and decrease. In the case of the connecting rods with low rigidity in recent years, the amount of decrease of the clearance (region near the butt surfaces of a pair of semi-cylindrical bearings) in the horizontal direction of the sliding bearing is large when the reciprocal inertia force acts on the connecting rod, and the phenomenon (close-in phenomenon) has occurred, in which the bearing inner circumferential surface at the circumferential end portion of the sliding bearing and the crankpin surface are directly in contact with each other.

In the case of the sliding bearing proposed in JP-A-2008-215563, the entire surface of the crush relief is covered with the soft layer, and in its circumferential direction, the depth of it is made shallower toward both end portions. When the crankpin and the sliding bearing relatively rotate, the foreign matters in the lubricant oil, which is present between the crankpin and the sliding bearing, move in the relative rotational direction of the crankpin along the inner surface of the sliding bearing. When the foreign matters are captured in the crush relief region, the foreign matters locally gather together in the portion with a shallow depth of the crush relief, and are pushed into the soft layer by the surface of the crankpin. These foreign matters are not completely buried in the soft layer, but are in the state exposed on the surface of the soft layer.

Contact of the foreign matters exposed on the surface of the soft layer and the surface of the crankpin continuously occurs due to the close-in phenomenon at the time of operation of the internal combustion engine, and the frictional heat generation amount locally increases in the portion where the foreign matters locally gather together and are embedded. Flow and melting occur due to softening of the soft layer on the portion where foreign matters are embedded by the resultant heat generation, and when the limit of holding the foreign matters is exceeded, a number of embedded foreign matters are simultaneously fed to the inner circumferential surface of the bearing (that is, the sliding surface) of the semi-cylindrical bearing existing in the same direction as the relative rotational direction of the crankpin, and therefore, there arises the problem that seizure easily occurs.

Further, conventionally, the countermeasures can be taken, which prevents contact of the crankpin surface and the inner circumferential surface of a sliding bearing due to a close-in phenomenon by enlarging the bearing gap between the crankpin surface and the inner circumferential surface of the bearing in the region of the circumferential end portion of the bearing by forming the inner circumferential surface of the sliding bearing into an arc shape in which the inside diameter in the horizontal direction is made large with respect to the vertical direction, as disclosed in JP-10-A-325410. Thus, in the internal combustion engines of recent years, the size of the oil pump is reduced, and the lubricant oil supply amount to the inner circumferential surface of the bearing tends to be decreased. In the case of the bearing with the bearing gap being enlarged as described in JP-A-10-325410, the leakage amount of the lubricant oil from the gap increases, and insufficiency of supply of the lubricant oil to the bearing inner circumferential surface occurs. Accordingly, under present circumstances, adoption of the sliding bearing as described in JP-A-10-325410 can be said to be difficult.

BRIEF SUMMARY OF THE INVENTION

An object of the present invention is to provide a slide bearing for a crankpin of an internal combustion engine, that is, a connecting rod bearing, superior for discharging foreign matters fed with lubrication oil through an interior lubrication oil path in a crankshaft.

According to the invention, for this object, a connecting rod bearing of an internal combustion engine as mentioned below is provided.

A bearing for a connecting rod of an internal combustion engine for rotatably supporting a crankpin of crank shaft including therein an interior lubrication oil path, the connecting rod including a main body and a cap so that the bearing is surrounded and supported by the main body and the cap, comprises, a pair of a first semi-cylindrical bearing part arranged on the main body and a second semi-cylindrical bearing part arranged on the cap, wherein each of the first and second semi-cylindrical bearing parts has a wall thickness decreasing region of its inner surface extending circumferentially from an axial whole length of a boundary between the first and second semi-cylindrical bearing parts to operate as a crush relief, and the first semi-cylindrical bearing part is arranged to align a circumferentially central portion of its semi-cylindrical cross section with a central axis of the connecting rod, wherein the wall thickness decreasing region of each of the first and second semi-cylindrical bearing parts has a first slant surface extending circumferentially from a central portion of the axial whole length of the boundary and a second slant surface extending circumferentially from each of axial side portions of the axial whole length of the boundary, between which axial side portions the central portion is arranged, and each of which axial side portions extends to respective one of axial ends of the axial whole length of the boundary, so that a first axial oil groove formed on the first slant surfaces and a second axial oil groove formed on the second slant surfaces communicate fluidly with each other, a cross sectional area of the first axial oil groove along an imaginary plane passing another boundary between the first and second axial oil grooves in a direction perpendicular to an axial direction of the bearing is greater than a cross sectional area of the second axial oil groove along the imaginary plane, a height of a farthermost end of the first slant surface from another imaginary plane passing both circumferential ends of each of the first and second semi-cylindrical bearing parts in another direction parallel to the axial direction of the bearing is not less than ¼ of a diameter of an outlet opening of the interior lubrication oil path on an outer peripheral surface of the crankpin and less than ½ of the diameter, an axial length of the first slant surface is more than the diameter and has an axial distance not less than 2 mm from each of the axial ends, the height of the farthermost end of the first slant surface is smaller than a height of a farthermost end of the wall thickness decreasing region from the another imaginary plane, and an axial central point of the first axial oil groove is aligned with an axial central point of the outlet opening.

[Configuration of the First and Second Axial Oil Grooves]

In each of bearing wall thickness decreasing region surfaces (A) adjacent to the whole of the circumferential end surfaces of upper and lower (first and second) semi-cylindrical bearings (I, II), a first slant surface (B) is formed at the central portion in the bearing width (axial) direction over to the circumferential end surface from the bearing wall thickness decreasing region surface, and at both sides in the bearing width direction of the first slant surface (B), second slant surfaces (D) are formed over to a circumferential end surface (C) from the bearing wall thickness decreasing region surface (A) connectively to the first slant surface (B) (FIGS. 9 and 10).

This configuration defines a first axial oil groove (E) which is located in the central portion in the bearing width direction and corresponds to the first slant surface (B), and a second axial oil grooves (F) which are located at each of both sides in the bearing width direction of the first axial oil groove (E) and correspond to the second slant surfaces (D), along the two contact surfaces of the circumferential end surfaces (a boundary between the first and second semi-cylindrical bearings) in the state in which the upper and lower semi-cylindrical bearings are assembled into a cylindrical shape. The one axial oil groove (E) and the two axial oil grooves (F) are in such relationship as to communicate with each other.

The formation range of the first slant surface in the bearing circumferential direction is expressed as the height of the upper edge of the first slant surface with respect to the horizontal surface when each of the semi-cylindrical bearings is placed on the horizontal plane with both the circumferential end surfaces of each of the semi-cylindrical bearings as the lower end surface, and is the height with the measurement of at least d/4 and less than d/2 at the maximum of an outlet opening diameter (d) of the inner lubricant oil passage in the outer circumferential surface of a crankpin (12).

According to the configuration, when a pair of semi-cylindrical bearings are assembled, the first axial oil groove (E) with the groove width of at least ½ of the lubricant oil outlet opening diameter (d) and less than the lubricant oil outlet opening diameter (d) at the maximum is formed, and the foreign matters accompanying the lubricant oil are discharged into the first axial oil groove from a lubricant oil outlet (Ex) (FIG. 9).

It should be noted that if the groove width of the first axial oil groove is less than ½ of the lubricant oil outlet opening diameter (D), the foreign matters are unlikely to be discharged from the lubricant oil outlet (Ex).

When a pair of semi-cylindrical bearings are assembled, in the first axial oil groove (E), the groove width is less than the lubricant oil outlet opening diameter (d) and the length in the bearing width direction exceeds the lubricant oil outlet opening diameter (d). Therefore, when the first axial oil groove (E) and the lubricant oil outlet (Ex) are aligned with each other, the moving direction side of the lubricant oil outlet (Ex) is blocked by the surface of the bearing wall thickness decreasing region (A). Accordingly, the foreign matters accompanying the lubricant oil which is discharged from the lubricant oil outlet (Ex) tends to flow to both the end sides in the lengthwise direction of the first axial oil groove (E) together with the lubricant oil, and are easily fed to the side of the second axial oil grooves (F) which communicate with the first axial oil groove (E) at both the ends in the lengthwise direction of the first axial oil groove (E). The foreign matters are discharged to the outside of the bearing through the second axial oil grooves (F) (FIG. 10).

Further, the length in the bearing width direction of the first slant surface (=the length in the bearing width direction of the first axial oil groove (E)) is larger than the outlet opening diameter (d) of the inner lubricant oil passage, and the maximum value of it is in the case in which the length in the bearing width direction between the first slant surface and the end surface in the bearing width direction is 2 mm. About this configuration, attention should be paid to the following points.

(1) When the length in the bearing width direction of the first axial oil groove (E) is the lubricant oil outlet opening diameter (d) or less, the foreign matters which are discharged into the first axial oil groove (E) from the lubricant oil outlet (Ex) contact the edge portion of the lubricant oil outlet (Ex) which is located at the rear side with respect to the rotational direction of the crankpin, and are likely to be dragged out to the bearing sliding surface side.

(2) When the length in the bearing width direction between the first slant surface and the end surface in the bearing width direction is 2 mm, the length in the bearing width direction of the first slant surface (=length in the bearing width direction of the first axial oil groove (E)) is the maximum, but in this case, the leakage amount of the lubricant oil is small.

[Foreign Matter Discharge Mechanism by the Second Axial Oil Groove]

During operation of the internal combustion engine, the connecting rod elastically deforms by the dynamic load and reciprocal inertia force, and the sliding bearing (I, II) at the connecting rod large end portion also elastically deforms as shown in FIGS. 11 to 14 so that a horizontal clearance (C1) of the sliding bearing (gap between the sliding bearing inner circumferential surface and the surface of the crankpin (12)) periodically repeats increase and decrease. At the time of operation in which the surface of the crankpin (12) and the inner circumferential surface (in the horizontal direction) of the bearing approach each other (while the state of FIGS. 11 and 12 changes to the state of FIGS. 13 and 14), the pressure of the lubricant oil between the two surfaces rises by the hydrodynamic squeezing action. At this time, the edge portion (FIG. 13) of the first axial oil groove (E) which is located at the same side as the rotational direction of the crankpin (12) approaches the surface of the crankpin (12) and hinders movement of the lubricant oil in the same direction. Therefore, the lubricant oil in the first axial oil groove (E) is accompanied by the included foreign matters (FM), enters the second axial oil grooves (F) which communicate with the first axial oil groove (E) at both the end portions in the lengthwise direction, and is discharged to the outside of the bearing (FIG. 14).

An ordinary internal combustion engine has a time deviation between the timing at which the lubricant oil outlet in the outer circumferential surface of the crankpin passes the first axial oil groove portion (E) and the timing at which the crankpin outer circumferential surface and the inner circumferential surface (inner circumferential surface located in the horizontal direction) in the butt region of the sliding bearing are the closest to each other. Therefore, discharge of the foreign matters into the first axial oil groove (E) from the lubricant oil outlet in the outer circumferential surface of the crankpin and discharge of the foreign matters (FM), which are discharged into the first axial oil groove (E), to the outside of the bearing are alternately performed periodically.

At the time of discharge of the foreign matters (FM) to the outside of the bearing, the lubricant oil is also discharged, but the lubricant oil is not always discharged, but is discharged at the timing at which the outer circumferential surface of the crankpin and the inner circumferential surface (inner circumferential surface located in the horizontal direction) in the butt region of the sliding bearing make the closest approach to each other, and therefore, the discharge amount of the lubricant oil to the outside of the bearing is small.

Further, the cross-sectional area in the circumferential direction of the first axial oil groove (E) in the communication portion of the first axial oil groove (E) and the second axial oil groove (F) is made larger than the cross-sectional area in the circumferential direction of the second axial oil groove (F) (FIGS. 15 and 16). Therefore, as compared with the flow velocity of the lubricant oil in the first axial oil groove (E), the flow velocity of the lubricant oil in the second axial oil groove (F) is higher, the foreign matters present in the second axial oil grooves (F) are hardly influenced by the flow of the lubricant oil flowing in the circumferential direction along the bearing inner circumferential surface with rotation of the crankpin. Therefore, the possibility is reduced that the foreign matters are pushed out from the inside of the second axial oil groove (F), move on the inner circumferential surface of the bearing, and thereby, enter the space between the sliding bearing and the sliding surface of the crankpin.

A height ($H_2$) of the first slant surface (B) is made smaller than the height ($H_1$) of the bearing wall thickness decreasing region measured with the same measurement reference as the height of the first slant surface (FIG. 10). By adopting the configuration, when the surface of the crankpin (12) and the bearing inner circumferential surface make the closest approach to each other, a wedge-shaped gap is formed between the surface of the bearing wall thickness decreasing region located between the upper edge ($B_1$) in FIG. 17 of the first slant surface (B) and the upper edge ($A_1$) in FIG. 17 of the bearing wall thickness decreasing region (A), and the crankpin surface as shown in FIG. 17. The lubricant oil which flows in the wedge-shaped gap rises in pressure by the hydrodynamic wedge action, and can prevent direct contact of the bearing sliding surface at the upper position from the upper edge ($A_1$) and the crankpin surface in FIG. 17.

If the aforementioned wedge-shaped gap is not formed in the case in which the height ($H_2$) of the first slant surface (FIG. 10) is made larger than the height ($H_1$) of the bearing wall thickness decreasing region, in the case in which the bearing wall thickness decreasing region is not formed on the inner circumferential surface of the bearing and the like, there is the fear that the crankpin surface and the inner circumferential surface (sliding surface) of the bearing other than the bearing wall thickness decreasing region are directly in contact with each other, the lubricant oil film between the two surfaces is broken and seizure occurs to the direct contact portion.

EMBODIMENTS OF THE PRESENT INVENTION (1) The groove depth of the first axial oil groove with the bearing wall thickness decreasing region surface as a reference in the circumferential end surface of the semi-cylindrical bearing is preferably set at 0.1 to 0.8 mm.

A foreign matter of a size (length) of about 0.1 mm at the maximum may be included in the lubricant oil, and if the aforementioned groove depth is about 0.1 mm or more, a large foreign matter can be caused to enter the first axial oil groove. Further, even if the crankpin surface and the first axial oil groove make the closest approach to each other, the situation can be prevented, in which the foreign matters are pushed to the groove bottom surface of the first axial oil groove by the crankpin surface and cannot be discharged. When the crankpin surface makes the closest approach to the bearing inner circumferential surface, if the bottom surface of the first axial oil groove is too alienated from the crankpin surface, the lubricant oil pressure in the first axial oil groove does not sufficiently rise, and the discharging efficiency of the foreign matters reduces. In order to prevent reduction in the foreign matter discharging efficiency, the groove depth is preferably set at 0.8 mm or less.

Since the first and second axial oil grooves are formed over the overall width of the bearing along the circumferential end surface, the bearing wall thickness decreasing region surface does not actually exist, but the aforementioned groove depth is measured with the virtual bearing wall thickness decreasing region surface which is formed by virtually extending the bearing wall thickness decreasing region surface from the portion adjacent to the first and the second axial oil grooves as the reference.

(2) The relationship of the height of the first slant surface and the height of the aforementioned bearing wall thickness decreasing region is preferably made to satisfy the relational expression "height of the first slant surface+1 mm<height of the bearing wall thickness decreasing region". If the relational expression is satisfied, the difference (that is, the length in the bearing circumferential direction of the aforementioned wedge-shaped gap) of the height of the bearing wall thickness decreasing region and the height of the first slant surface exceeds 1 mm, the pressure of the lubricant oil which flows in the wedge-shaped gap becomes high, and the crankpin surface and the inner circumferential surface of the bearing are hardly in direct contact with each other.

(3) Chamfering is preferably applied to the portion connecting to the second axial oil groove from the first axial oil groove, and the stepped transition portion between both the grooves is made smooth. As a result, the cross-sectional area in the bearing inner circumferential direction of the first axial oil groove becomes gradually smaller toward the second axial oil groove, and movement of the foreign matters from the first axial oil groove to the second axial oil groove is performed smoothly.

(4) The groove depths of the first and the second axial oil grooves from the bearing wall thickness decreasing region surface in the circumferential end surface of the semi-cylindrical bearing is preferably made to satisfy the relational expression "the depth of the second axial oil groove> the depth of the first axial oil groove". In this case, a small groove in the shape of extension of the bottom portion of the second axial oil groove can be formed in the bottom portion of the first axial oil groove. This small groove has the function of guiding the foreign matters into the second axial oil groove from the first axial oil groove (FIGS. 8 and 9).

(5) The relationship of the groove width (L2) and the groove depth (L1) of the second axial oil groove is preferably made to satisfy the relational expression $L2<2\times L1$. The relationship of the groove width (L2) and the groove depth (L1) of the second axial oil groove is more desirably made to satisfy the relational expression $L2<L1$ (FIG. 18).

According to the configuration, the foreign matters which move along the groove bottom of the second axial oil groove hardly receive the influence of the flow of the lubricant oil which flows in the circumferential direction along the bearing inner circumferential surface with rotation of the crankpin, and the possibility is reduced, that the foreign matters are pushed out from the inside of the second axial oil groove to move to the inner circumferential surface of the bearing, and thereby, enter the space between the sliding bearing and the sliding surface of the crankpin. In the case of $L2 \geqq 2\times L1$, even if the cross-sectional area of the second axial oil groove is made smaller than the cross-sectional area of the first axial oil groove, and the oil flow in the second axial oil groove is increased to enhance the foreign matter discharge effect, the foreign matters are easily influenced by the flow of the lubricant oil in the circumferential direction in the vicinity of the crankpin surface by rotation of the crankpin, and discharge of the foreign matters to the outside of the bearing along the axial groove becomes difficult. The relationship of L1 and L2 is desirably set in the range of the groove depth L1 of the axial groove of 0.15 mm or more, and the groove width L2 of 1 mm or less.

DETAILED DESCRIPTION OF THE INVENTION

Hereinafter, embodiments of the present invention will be described with reference to the attached drawings.

Figure 1:
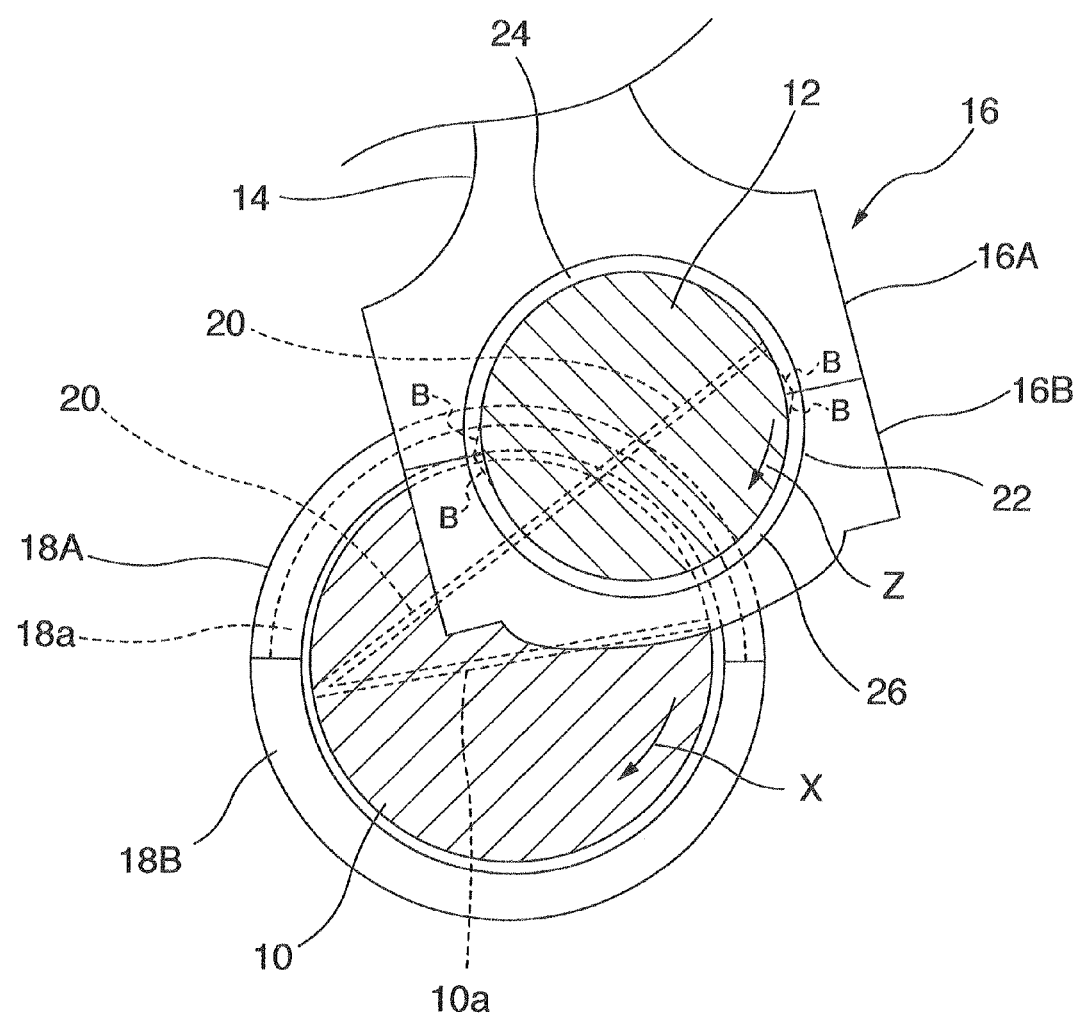
FIG. 1 is a schematic view of a crankshaft of an internal combustion engine which is cut at a journal part and a crankpin part respectively.

FIG. 1 is a schematic view in which a crankshaft of an internal combustion engine is cut at a journal part and a crankpin part respectively, and shows a journal 10 (that rotates in an arrow X direction), a crankpin 12 and a connecting rod 14. The positional relationship of the three members in the paper depth direction is such that the journal 10 is at the deepest side of the paper surface, the crankpin 12 is at the front side, and the crankpin 12 is surrounded by a large end portion housing 16 of the connecting rod 14 which carries a piston at the other end.

The journal 10 is supported at the lower portion of the cylinder block of the internal combustion engine via a pair of semi-cylindrical bearings 18A and 18B. In the semi-cylindrical bearing 18A located at the upper side in the drawing, a lubricant oil groove 18a is formed over the overall length of the inner circumferential surface of the semi-cylindrical bearing 18A.

Further, the journal 10 has a through-hole 10a in the diameter direction thereof, and when the journal 10 rotates in the arrow x direction, openings at both ends of the through-hole 10a alternately communicate with the lubricant oil groove 18a.

Further, a lubricant oil passage 20 is formed in the crankshaft to penetrate through the journal 10, a crank arm (not illustrated) and the crankpin 12.

The crankpin 12 which rotates in the arrow Z direction is held by the large end portion housing 16 (this is constituted of a large end portion housing 16A at a connecting rod side and a large end portion housing 16B at a cap side) of the connecting rod 14 via a pair of semi-cylindrical bearings 24 and 26. The semi-cylindrical bearings 24 and 26 are assembled with their butt end surfaces butted to each other to be formed into a cylindrical connecting rod bearing 22.

Embodiment 1

Figure 2:
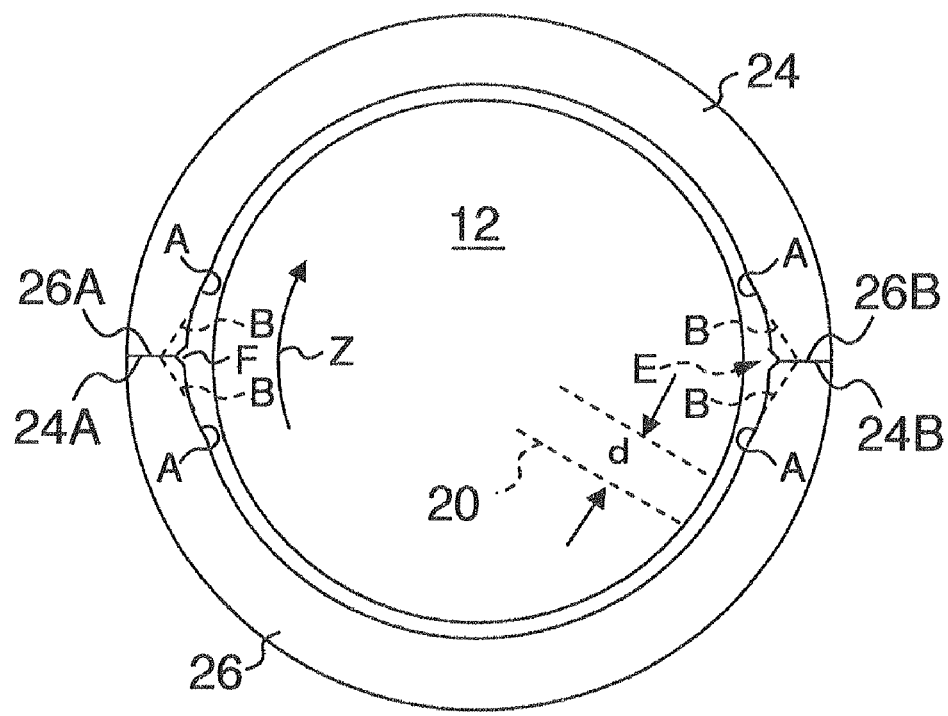
FIG. 2 is a front view of a connecting rod bearing according to one embodiment of the present invention.
Figure 3:
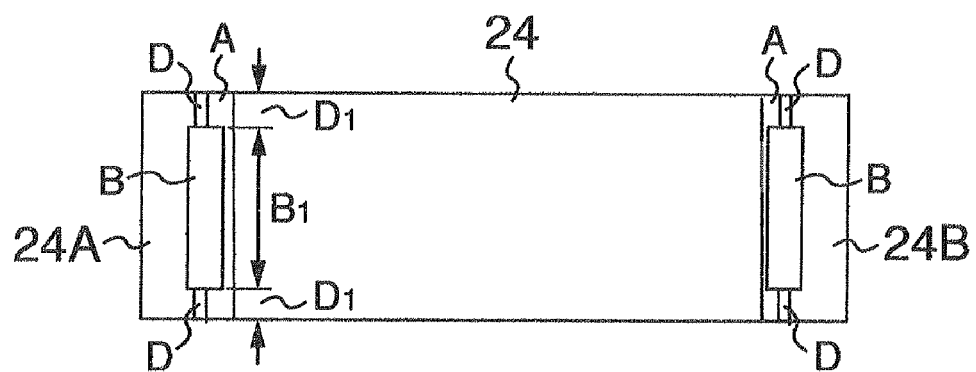
FIG. 3 is a view of an inner circumferential surface of a semi-cylindrical bearing which is a half body of the connecting rod bearing shown in FIG. 2.
Figure 4:
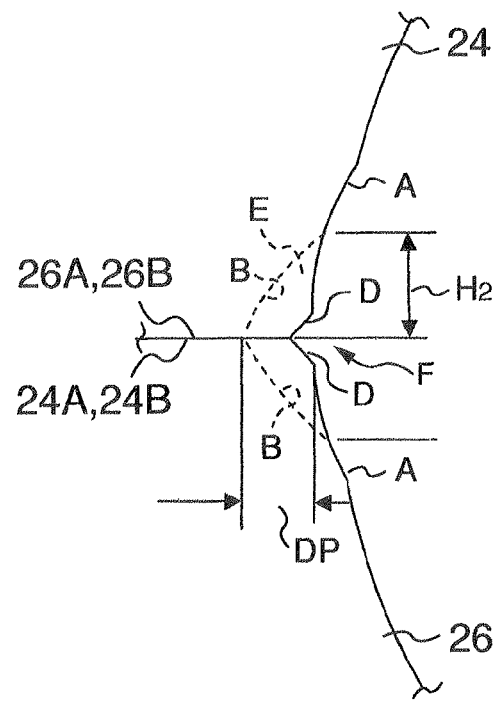
FIG. 4 is a partially enlarged view of the connecting rod bearing shown in FIG. 2.

FIGS. 2 to 4 show the details of the upper and the lower semi-cylindrical bearings 24 and 26 constituting the connecting rod bearing 22. The semi-cylindrical bearings 24 and 26 have the same shapes (About similarity of the reference numerals of both the semi-cylindrical bearings, see "Description of Symbols" at the end of the description), and therefore, the shape of only one of them will be described.

The semi-cylindrical bearing 24 is laterally symmetrical in the drawings.
[Crush Relief]
Bearing wall thickness decreasing regions (See bearing wall thickness decreasing region surfaces A) in which the bearing wall thickness is made small are formed toward the central portion in the circumferential direction of the semi-cylindrical bearing 24 from circumferential end surfaces 24A and 24B of the semi-cylindrical bearing 24. The bearing wall thickness decreasing region is generally called a crush relief (See paragraph [0004]).

Example of the size of the wall thickness decreasing region (crush relief region): circumferential length=3 mm to 15 mm, and the decreasing amount of thickness in the circumferential end portion with the bearing wall thickness at the central portion in the circumferential direction as the reference=0.01 to 0.05 mm
[First and Second Axial Oil Groove]
On the bearing wall thickness decreasing region surfaces A adjacent to the circumferential end surfaces 24A, 24B, 26A and 26B of the semi-cylindrical bearings 24 and 26, first slant surfaces B are respectively formed at the central portion in the axial direction from the bearing wall thickness decreasing region surfaces over to the circumferential end surfaces. Further, second slant surfaces D are formed from the bearing wall thickness decreasing region surfaces A over to the circumferential end surfaces 24A and 24B ranging to both sides in the bearing width direction of the first slant surfaces B. The first slant surface B and a pair of second slant surfaces D are formed to be plane symmetrical in the bearing width direction.

The dimensional relationship of the first slant surface B is as follows.

(1) When a length (B1) in the bearing width direction is the maximum, a length (D1) between the first slant surface B and the end surface in the bearing width direction is 2 mm.

(2) The length (B1) in the bearing width direction of the first slant surface B is larger than an outlet opening diameter (d) of the inner lubricant oil passage in the outer circumferential surface of the crankpin 12.

(3) A height (H2) of the first slant surface B with the circumferential end surface of the semi-cylindrical bearing as the reference is at least ¼ and less than ½ at the maximum of the outlet opening diameter (d) of the inner lubricant oil passage in the crankpin outer circumferential surface.

This configuration defines one first axial oil groove (E) and two second axial oil grooves (F) along the two contact surfaces of the circumferential end surfaces in the state in which the semi-cylindrical bearings 24 and 26 are assembled into a cylindrical shape. Here, the first axial oil groove (E) corresponds to the first slant surface (B), and the second axial oil groove (F) corresponds to the second slant surface (D).

A groove depth (DP) of the first axial oil groove (E) is 0.1 to 0.8 mm. Since the circumferential end surface of the semi-cylindrical bearing is cut, the groove depth (DP) is set with a virtual line as the reference by forming the virtual line by extending the bearing wall thickness decreasing region surface (A) to the region of the first axial oil groove (E) in FIG. 4.

Embodiment 2

Figure 5:
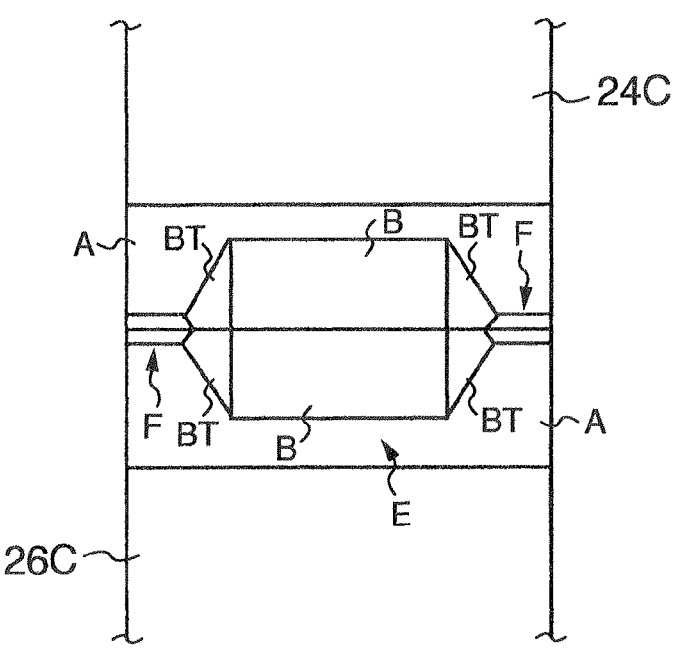
FIG. 5 is a view of an inner circumferential surface with a butt portion of a pair of half-cylindrical bearings of the connecting rod bearing according to another embodiment of the present invention being partially seen.
Figure 6:
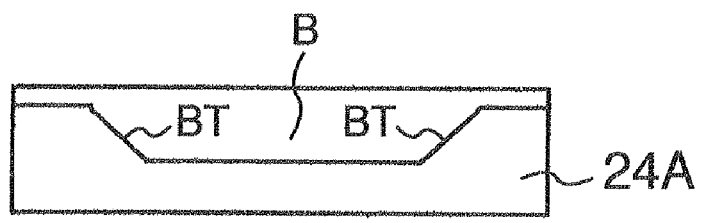
FIG. 6 is a view of a circumferential end surface of one of the semi-cylindrical bearings shown in FIG. 5.

Semi-cylindrical bearings 24C and 26C shown in FIGS. 5 and 6 will be described. In the case of the semi-cylindrical bearings 24 and 26 shown in embodiment 1, steps caused by the difference of the cross-sectional areas of both the first axial oil grooves (E) and the second axial oil grooves (F) are present in the communication portions of the first axial oil grooves (E) and the second axial oil grooves (F). In embodiment 2, the step portions are formed into slant surfaces by chambering. A slant surface (BT) formed by chamfering is a transition region (communicating portion) between the first axial oil groove (E) and the second axial oil groove (F).

According to the configuration, the flow of the lubricant oil accompanied by foreign matters, which extends from the first axial oil groove (E) to the second axial oil grooves (F) with small cross-sectional areas is made smooth.

The aforementioned transition region defined by a pair of slant surfaces (BT) belongs to the region of the first axial oil groove (E). However, when the cross-sectional areas of the first axial oil groove (E) and the second axial oil groove (F) are compared, it would be proper to grasp the communication portion of the first axial oil groove (E) and the second axial oil groove (F) with the transition region excluded.

Embodiment 3

Semi-cylindrical bearings 24D and 26D shown in FIGS. 7 and 8 will be described.

Figure 7:
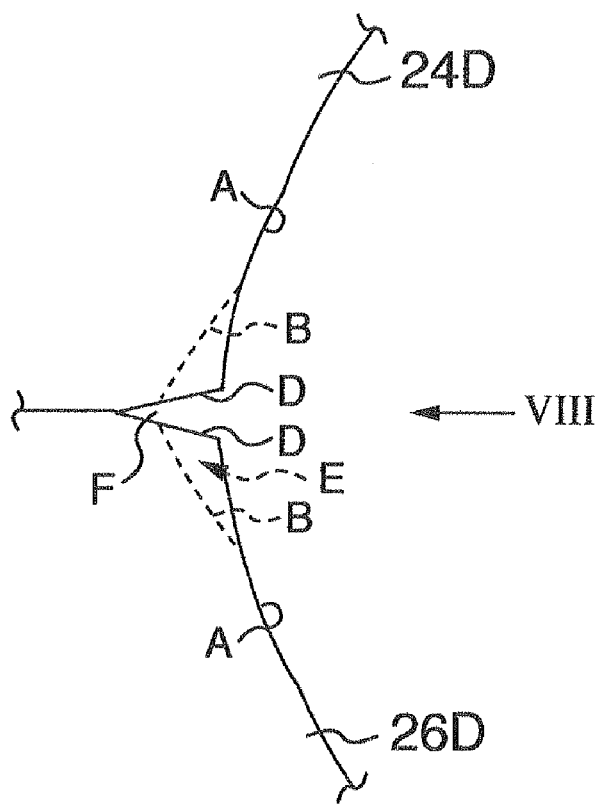
FIG. 7 is a front view of a partially seen butt portion of a pair of semi-cylindrical bearings of a connecting rod bearing according to still another embodiment of the present invention.
Figure 8:
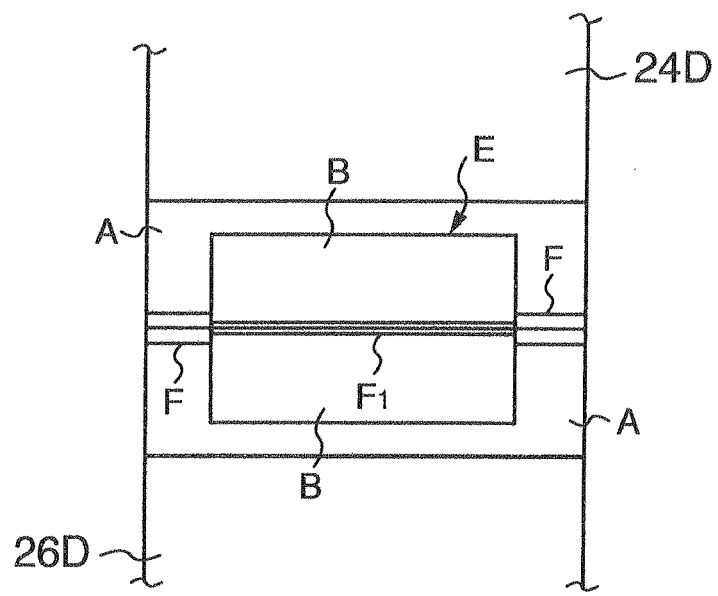
FIG. 8 is a view taken along the arrow VIII of FIG. 7.
Figure 9:
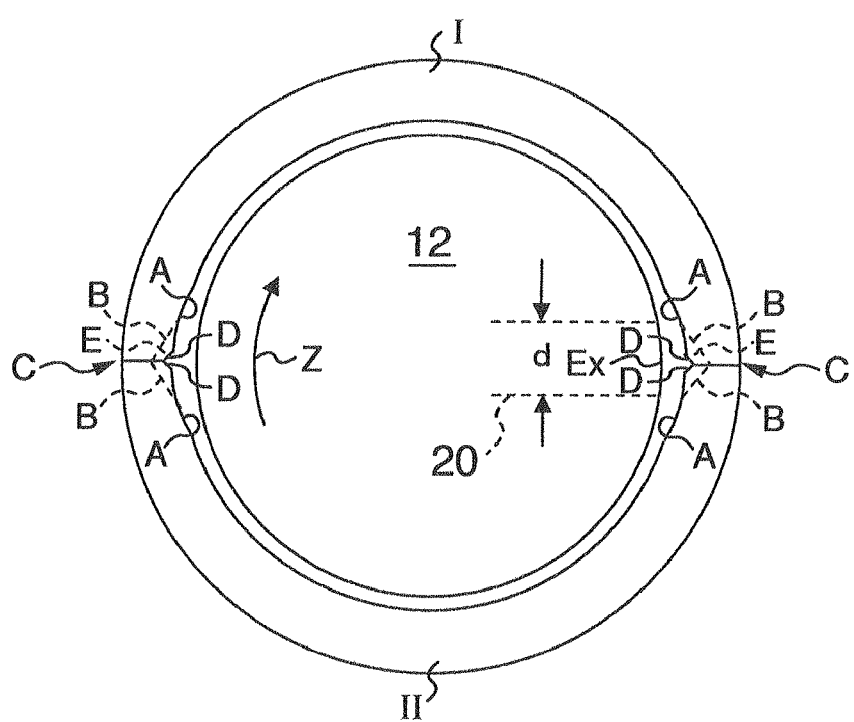
FIG. 9 is a schematic view for explaining the connecting rod bearing of the present invention.
Figure 10:
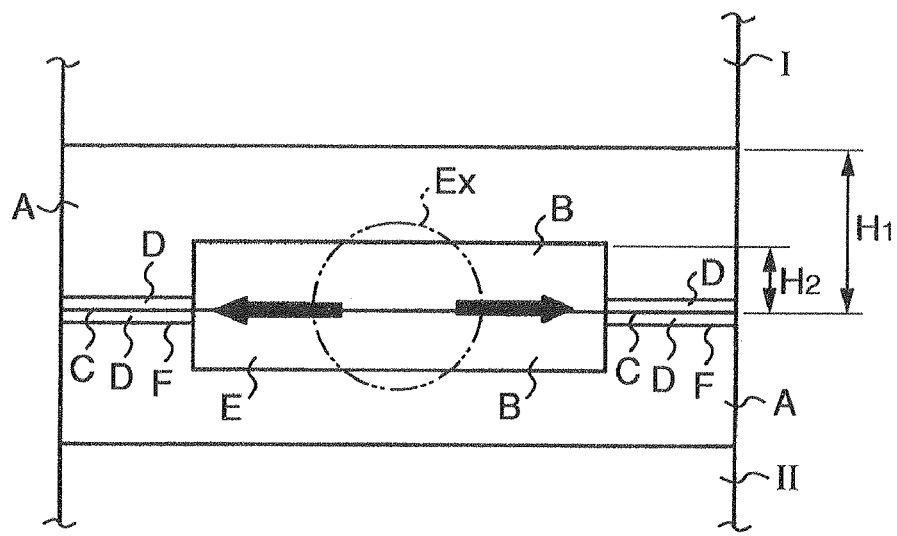
FIG. 10 is a view of a part of an inner circumferential surface of the connecting rod bearing shown in FIG. 9.
Figure 11:
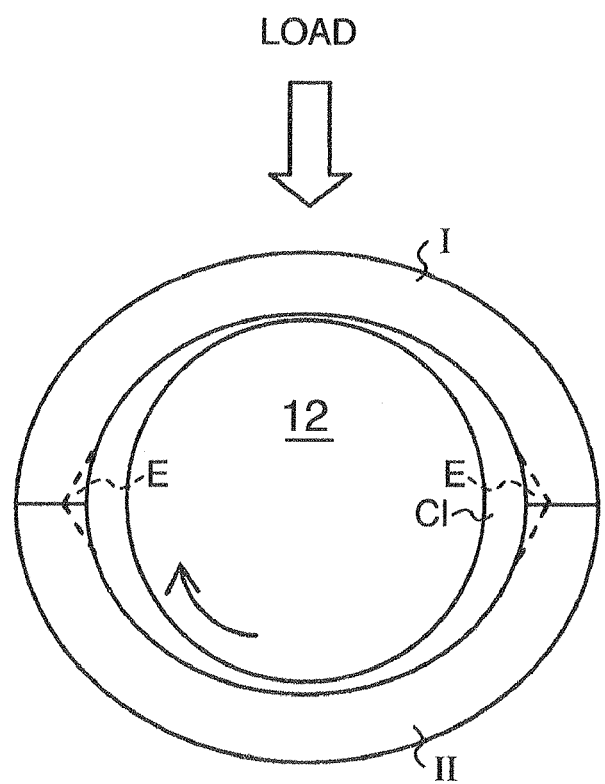
FIG. 11 is a view showing a deformed state of the connecting rod bearing in the case of a load acting on the connecting rod bearing of the present invention.
Figure 12:
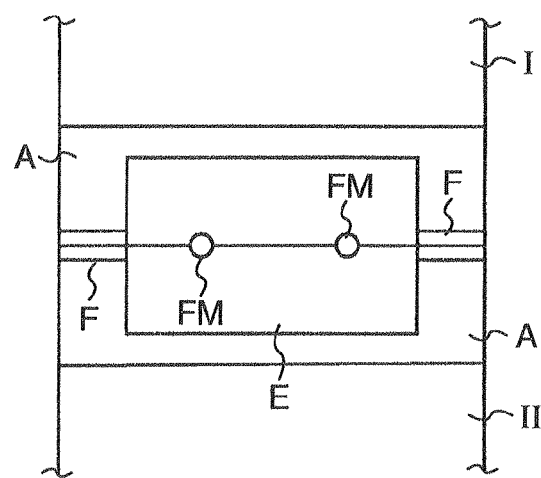
FIG. 12 is a view of a partial inner circumferential view of the connecting rod bearing, which corresponds to FIG. 11.
Figure 13:
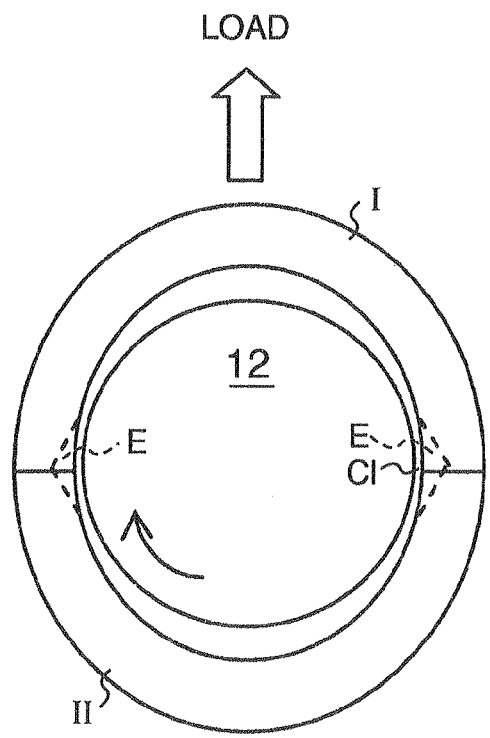
FIG. 13 is a view showing a deformed state of the connecting rod bearing in the case of a load different from the case of FIG. 11 acting on the connecting rod bearing of the present invention.
Figure 14:
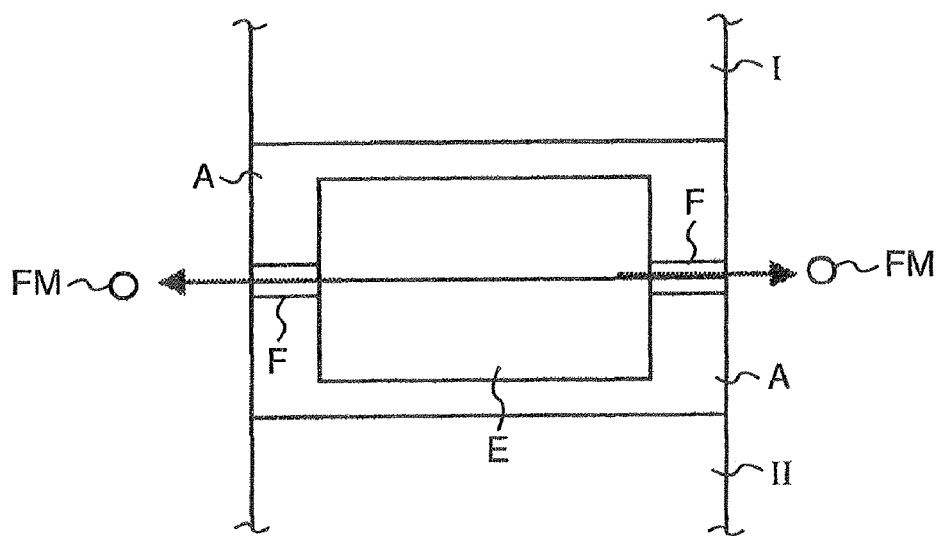
FIG. 14 is a view of a partial inner circumferential surface of the connecting rod bearing, which corresponds to FIG. 13.
Figure 15:
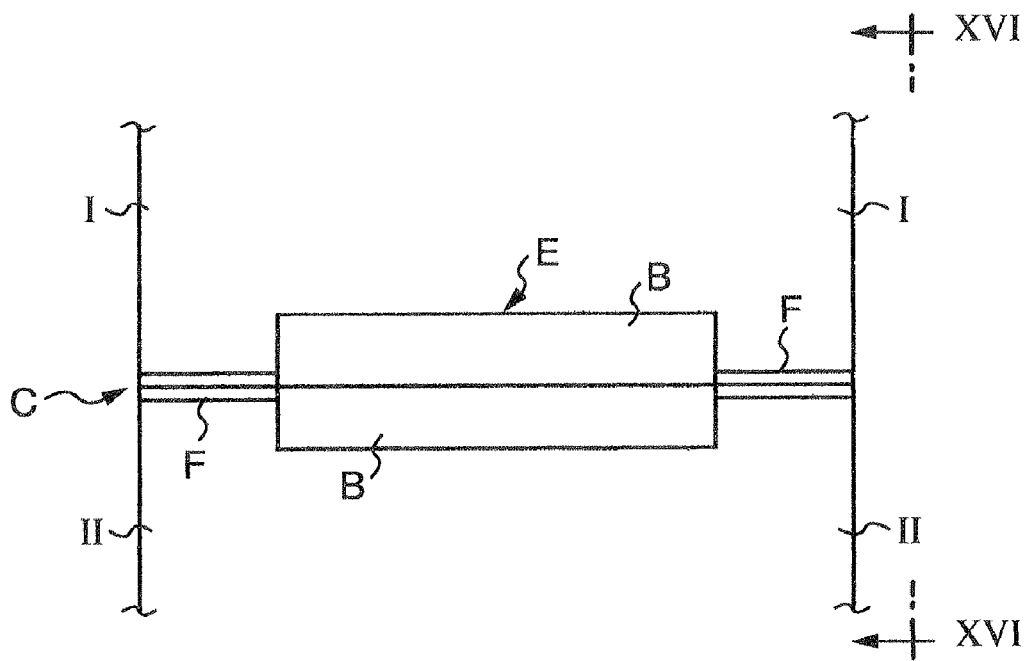
FIG. 15 is a view of a partial inner circumferential surface of a connecting rod bearing showing one embodiment of the connecting rod bearing of the present invention.
Figure 16:
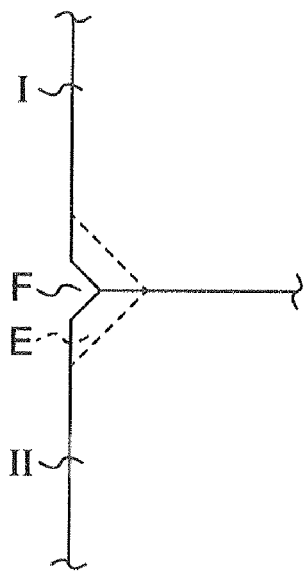
FIG. 16 is a view taken along the line XVI to XVI in FIG. 15.
Figure 17:
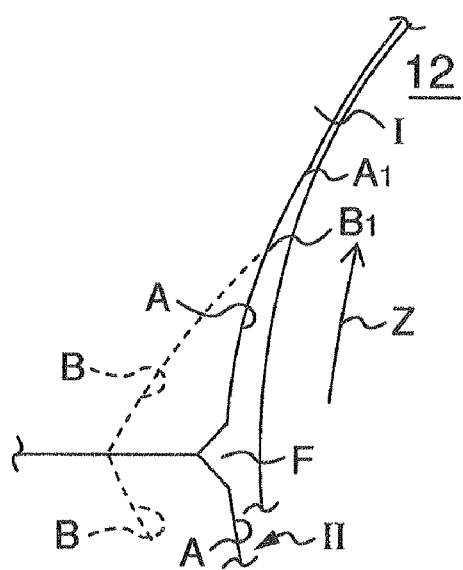
FIG. 17 is a partial schematic view showing one operational mode of the connecting rod bearing of the present invention.
Figure 18:
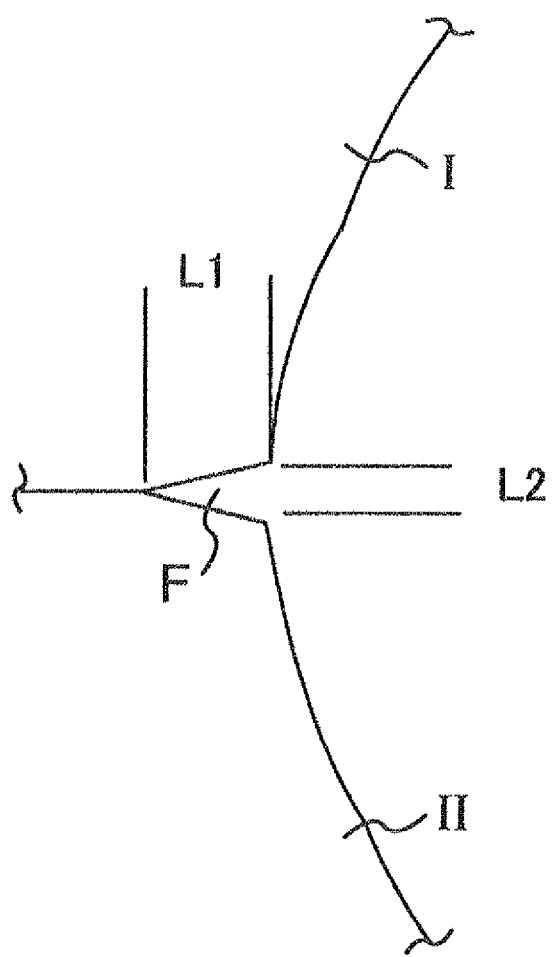
FIG. 18 is a partial schematic view showing an example of a cross-sectional shape of a second axial oil groove in the connecting rod bearing of the present invention.

The groove depth of the second axial oil groove (F) defined by a pair of second slant surfaces (D) is made larger than the groove depth of the first axial oil groove (E) defined by a pair of first slant surfaces (B) (FIG. 7). Therefore, a small groove (F1) with the depth corresponding to the difference of the groove depths of the first axial oil groove (E) and the second axial oil groove (F) is present along the groove bottom of the first axial oil groove (E) as the extension portion of the second axial oil groove (F) (FIG. 8). The small groove (F1) functions as the guide groove for the foreign matters present in the first axial oil groove (E) to move into the second axial oil grooves (F) smoothly.

The invention claimed is:

1. A bearing for a connecting rod of an internal combustion engine for rotatably supporting a crankpin of crank shaft including therein an interior lubrication oil path, the connecting rod including a main body and a cap so that the bearing is surrounded and supported by the main body and the cap, the bearing comprising,
 a first semi-cylindrical bearing part arranged on the main body and a second semi-cylindrical bearing part arranged on the cap, wherein each of the first and second semi-cylindrical bearing parts has a wall thickness decreasing region of an inner surface thereof extending circumferentially from an axial whole length of a boundary between the first and second semi-cylindrical bearing parts to operate as a crush relief, and the first semi-cylindrical bearing part is arranged to align a circumferentially central portion of a semi-cylindrical cross section thereof with a central axis of the connecting rod,
 wherein the wall thickness decreasing region of each of the first and second semi-cylindrical bearing parts has a first slant surface extending circumferentially from a central portion of the axial whole length of the boundary and a second slant surface extending circumferentially from each of axial side portions of the axial whole length of the boundary, wherein the axial side portions are arranged between the central portion and each side portion extends to one of axial ends of the axial whole length of the boundary, so that a first axial oil groove formed on the first slant surfaces and a second axial oil groove formed on the second slant surfaces communicate fluidly with each other,
 a cross sectional area of the first axial oil groove along an imaginary plane passing between the first and second axial oil grooves in a direction perpendicular to an axial direction of the bearing is greater than a cross sectional area of the second axial oil groove along the imaginary plane,
 a height of a farthermost end of the first slant surface from another imaginary plane passing both of each of the first and second semi-cylindrical bearing parts in a direction parallel to the axial direction of the bearing is not less than ¼ of a diameter of an outlet opening of the interior lubrication oil path on an outer peripheral surface of the crankpin and less than ½ of the diameter,
 an axial length of the first slant surface is more than the diameter and has an axial distance not less than 2 mm from each of the axial ends,
 the height of the farthermost end of the first slant surface is smaller than a height of a farthermost end of the wall thickness decreasing region from the another imaginary plane, and
 an axial central point of the first axial oil groove is aligned with an axial central point of the outlet opening.

2. The bearing according to claim 1, wherein the first axial oil groove has at the circumferential end of each of the first and second semi-cylindrical bearing parts a depth of 0.1 to 0.8 mm with respect to a part of the wall thickness decreasing region adjacent circumferentially to the first axial oil groove.

3. The bearing according to claim 1, wherein 1 mm plus the height of the farthermost end of the first slant surface less than the height of the farthermost end of the wall thickness decreasing region, is satisfied.

4. The bearing according to claim 1, wherein the second slant surface is chamfered to form a smooth transition between the first and second slant surfaces.

5. The bearing according to claim 1, wherein the first axial oil groove has at the circumferential end of each of the first and second semi-cylindrical bearing parts a first depth with respect to a part of the wall thickness decreasing region adjacent circumferentially to the first axial oil groove, the second axial oil groove has at the circumferential end of each of the first and second semi-cylindrical bearing parts a second depth with respect to another part of the wall thickness decreasing region adjacent circumferentially to the second axial oil groove, and the second depth is greater than the first depth.

6. The bearing according to claim 1, wherein when a depth of the second axial oil groove is L1, and a width of the second axial oil groove is L2, a formula of L2<2×L1 is satisfied.

7. The bearing according to claim 6, wherein a formula of L2<L1 is satisfied.

8. In a bearing apparatus comprising a bearing and a connecting rod for an internal combustion engine for rotatably supporting a crankpin of a crank shaft, the connecting rod including a main body and a cap so that the bearing is surrounded and supported by the main body and the caps,
 the improvement wherein the bearing is in accordance with claim 1.

* * * * *